3,461,747
REVERSIBLE VARIABLE STROKE
POWER ACTUATOR
Leroy W. Simonson, Beloit, Wis., and Barry A. Dahlberg, Rockton, Ill., assignors to Warner Electric Brake & Clutch Company, South Beloit, Ill., a corporation of Delaware
Filed Nov. 22, 1967, Ser. No. 685,162
Int. Cl. F16h 25/08
U.S. Cl. 74—828
6 Claims

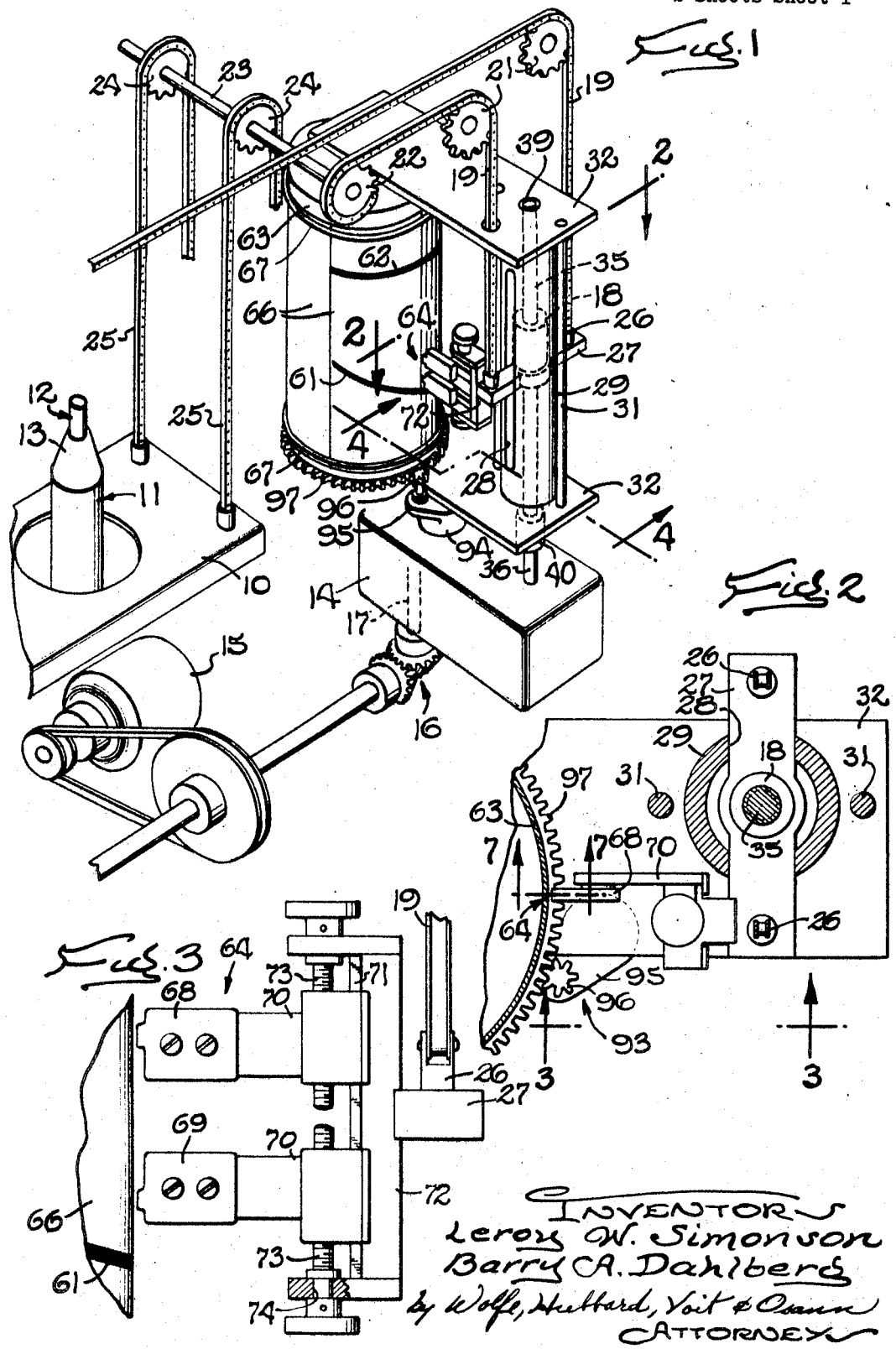

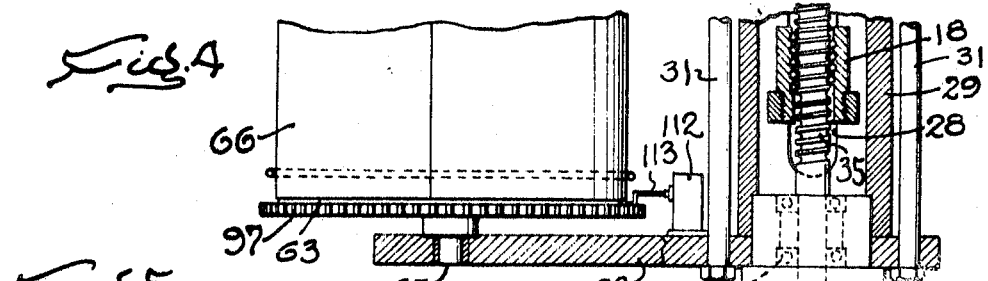
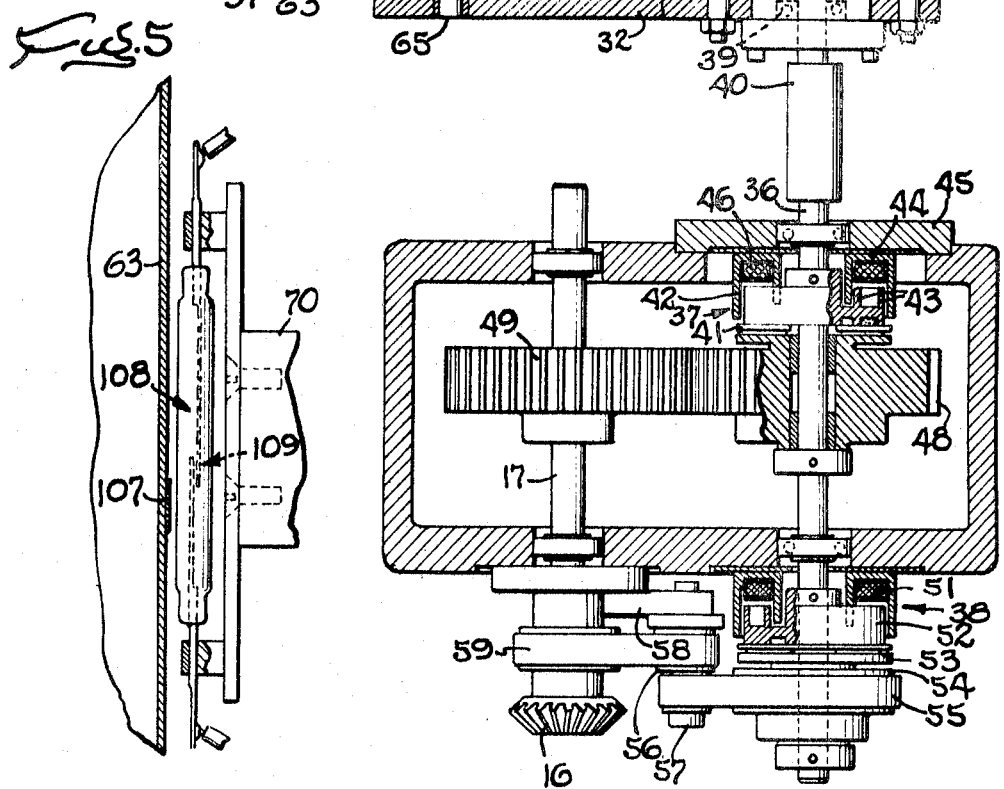
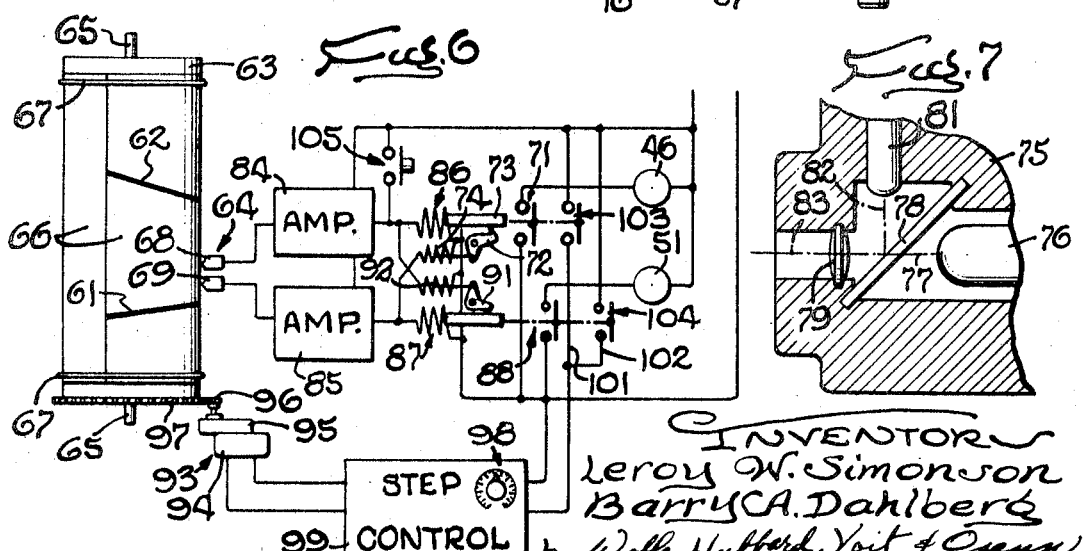

ABSTRACT OF THE DISCLOSURE

A reversible variable stroke power transmission drives the ring rail of a textile machine up and down to build yarn masses of contours determined by the lateral spacing of lines extending along a flexible pattern wrapped around the cylindrical surface of a rotary and indexable drum. The pattern is scanned by a photoelectric or magnetically sensitive feeler which controls the selective energization of two magnetic friction clutches for reversely rotating a screw shaft paralleling the drum axis and mating with a nut carying the feeler. The nut is linked to the ring rail whose motion is reversed each time the feeler reaches one of the pattern lines, the length of each stroke of the nut also being determined by the angular position of the drum which is indexed to present different portions of the lines to the feeler. The indexing is effected in unison with reversals of the screw shaft rotation and the feeler includes two photocells individually adjustable along the nut to scan different areas of the pattern and individually controlling the activation of the respective clutches.

BACKGROUND OF THE INVENTION

This invention relates to a reversible power transmission for driving a part such as the ring rail of a textile machine alternately in opposite directions through strokes of selectively variable lengths determined by the duration of activation of separate electromagnetically controlled friction clutches. The latter may be controlled by a feeler movable back and forth with the driven part and engageable with patterns of variable contour spaced apart along and extending around a rotary drum which is indexed automatically as an incident to the reversals in the drive.

SUMMARY OF THE INVENTION

In a transmission of the above general character, the present invention provides for controlling the clutches through the use of a pattern of inexpensive and easily replaceable construction which can be scanned by a feeler operable photoelectrically or magnetically without mechanical control with the pattern. The invention also resides in the novel construction of the feeler to permit the lengths of the opposite strokes as well as the terminal positions thereof to be adjusted individually.

BRIEF DESCRIPTION OF THE DRAWINGS

FIGURE 1 is a fragmentary perspective view of part of a spinning frame equipped with a reversible drive embodying the novel features of the present invention.

FIG. 2 is a fragmentary section taken along the line 2—2 of FIG. 1.

FIG. 3 is a fragmentary elevational view of the pattern feeler taken along the line 3—3 of FIG. 2.

FIG. 4 is a fragmentary section taken along the line 4—4 of FIG. 1.

FIG. 5 is a fragmentary view similar to FIG. 3 showing a modification.

FIG. 6 is a schematic view and wiring diagram.

FIG. 7 is a fragmentary section taken along the line 7—7 of FIG. 2.

DESCRIPTION OF THE PREFERRED EMBODIMENTS

While the present invention is a reversible and variable stroke power transmission of general utility, it is shown in the drawings for purposes of illustration in connection with the raising and lowering of the ring rail 10 (FIG. 1) of a spinning frame to control, during the spinning of yarn masses 11 onto bobbins 12 and the layer upon layer pattern of the mass so as to produce a desired final external contour of the mass including the shaping of the end portions 13 thereof. For this use, the driving parts of the improved transmission are mounted in and on a housing 14 at one end of the spinning machine and driven from the main drive motor 15 of the machine and in synchronism with the various movable parts thereof. Herein the drive from the motor extends through bevel gearing 16 to a vertical shaft 17 extending through and journaled in the housing 14.

In the present instance, the driven element of the transmission is a nut 18 coupled to the ring rail 10 for raising and lowering the same during the back and forth movements of the nut. The coupling may be effected through chains 19 (FIG. 1) meshing with idler sprockets 21 extending to and meshing with sprockets 22 on cross-shafts 23 spaced along and disposed above the ring rail. Fast on these shafts are pairs of axially spaced sprockets 24 meshing with chains 25 fixed at one end to the ring rail. Herein the driving ends of the chains 19 are fixed at 26 to opposite ends of a horizontal bar 27 bodily slidable along vertical guide slots 28 in an upright tube 29. The latter is clamped by tie bolts 31 between plates 32 rigid with the framework of the spinning frame. One end of the nut 18 is threaded into a hole in the crossbar with a shoulder thereon in rigid abutment with the bar. The ring rail 10 thus moves upwardly and downwardly with the nut.

In the present instance the nut is threaded onto a conventional ball screw 35 through the medium of balls 34 which roll in opposed helical grooves in the nut and screw. At opposite ends the screw is journaled in bearings 39 in the plates 32 and is joined by a flexible coupling 40 to the upper end of a shaft 36 journaled in spaced bearings 47 in the housing 14. Power for rotating the shaft 36 is derived from the unidirectionally rotated drive shaft 17 and transmitted in opposite directions to the screw 35 by the selective engagement of clutches 37 and 38 which are of the friction type and electrically controlled for instantaneous engagement and disengagement.

The clutch 37 is of conventional stationary field construction and includes an armature ring 41 rotatable with the drive shaft 17 and adapted for axial gripping engagement with the friction face of a rotor 42 fast on the shaft 36. The rotor comprises magnetically separated and rigidly joined tubular pole pieces 43 loosely telescoped with the concentric pole pieces of a magnet core 44 fixed to the upper end of the housing 14 by the bearing plate 45 and enclosing an annular winding 46 which is energized and deenergized to engage and disengage the clutch. The clutch armature is adapted for some axial floating and is mounted at one end of a gear 48 meshing with a gear 49 on the drive shaft 17.

The clutch 38 is of the same construction including a stationary winding 51, a rotor 52 fast on the shaft 36 and an armature ring 53 carried by a sheave 54 loose on the shaft 36 and housing teeth meshing with a toothed belt 55 to reverse the motion transmitted from the drive shaft 17 to the driven shaft 36. The teeth of the belt 55 mesh with a sheave 56 fast on an idler shaft 57 journaled in a bracket 58 and coupled to the drive shaft 17 through a toothed belt 59.

With the arrangement above described, it will be apparent that the screw 35 will be driven in one direction when the clutch 37 is engaged by energization of its winding 46 and in the opposite direction while the winding 51 of the clutch 38 is energized. Thus, the nut 18 is advanced back and forth along the screw 35 and the ring rail 10 is raised and lowered in strokes whose lengths are determined by the duration of energization of the clutch windings 46 and 51.

To utilize the reversible and variable stroke transmission above described controlling the up and down movements of the ring rail 10 to build yarn masses of desired contours, provision is made for deenergizing the active clutch and immediately energizing the other clutch when the nut 18 reaches predetermined opposite limits in its travel along the screw. In accordance with the present invention, the reversals in the rotation of the screw 35 to accomplish this are effected automatically in accordance with the changing contour of two patterns 61 and 62 spaced along and wrapped around a rotatably mounted drum 63 which is indexed in synchronism with the rotation of the screw. Herein the patterns coact with a feeler 64 which operates without mechanical engagement with patterns. The drum comprises a tubular cylinder having end trunnions 65 journaled in the plates 32 so as to support the drum alongside and parallel to the screw 35, the drum being longer than the maximum length of the strokes to be imparted to the nut 18 and the rail 10 or other part to be reciprocated.

Preferably and in the form shown in FIGS. 1 through 6, the patterns comprise lines spaced apart and extending along a flexible sheet 66 of paper or the like wrapped around and detachably secured to the surface of the drum. The attachment may be accomplished in various ways as by resilient bands or garter springs 67 contracted around the ends of the sheet 66 beyond the patterns. Preferably the latter are simple lines of a color contrasting with the background sheet and varying in shape according to the points in the alternate strokes of the nut at which the motion reversals are to take place as sensed by the feeler 64 in the different indexed positions of the drum.

With patterns of the above character, the feeler 64 is constructed to operate photoelectrically in scanning the pattern sheet and producing control signals when reaching the respective pattern lines. To enable the reversals in nut motions to be adjusted individually along the drum for a given position of the pattern sheet, the feeler preferably comprises two photosensitive units 68 and 69 disposed side by side and spaced along the drum and projecting from blocks 70 slidable along a guide 71 on a bracket 72 projecting toward the drum from the cross-bar 27 attached to the nut. The positions of the photocell units along the guide 71 is determined by the adjustment of screws 73 journaled at 74 on the bracket 72 and threading into the blocks 70.

As shown in FIG. 7, each of the units 68, 69 comprises a casing 75 having therein a light source in the form of an electric lamp 76 for directing a light beam along a line 77 and through a transparent screen 78 and a lens 79 against the pattern sheet, and a photocell 81 responsive to changes in the intensity of the light reflected as indicated at 82 against the cell from the exposed surface of the screen. Thus, as is well understood in the art, signals of different intensities are produced by the photocell when the light beam 83 impinges against the background sheet as when it encounters the contrasting color of one of the pattern lines 61, 62.

The signals derived through the photocells are magnified by electronic amplifiers 84, 85 which are of well known construction and control the energization of relays 86 and 87 which activate switches for effecting release of one of the clutches 37 and 38 and engagement of the other each time the light beam of one of the units 68 and 69 reaches the pattern line 62 after traversing the intervening area of the pattern sheet 66. When the relay 86 controlled by the upper feeler unit 68 is energized a switch 71 is closed thus completing a circuit shown in FIG. 6 for energizing the winding 46 of the clutch which drives the nut 18 and feelers 64 downwardly. Closure of the switch 71 may be maintained in various ways but as shown herein is accomplished by a latch 72 spring biased into engagement with the armature 73 of the relay and carried by the armature of a relay 74. The latter is arranged in parallel with the winding of the relay 87 so as to be released in response to the next energization of this relay.

Similarly, the relay 87 when energized, closes a switch 88 for energizing the winding 51 to engage the clutch 38 and intiate an upstroke of the nut. The switch closed position of the armature 89 is retained by a spring biased latch 91 which is release by energization of a relay 92 whose winding is in parallel with the relay winding 86.

To present different parts of the patterns 61 and 62 to the feeler 64 in successive strokes of the nut 18, means is provided for indexing the drum unidirectionally and intermittently or continuously but in accurate synchronism with reciprocations of the feeler. While this means may take various forms, it is preferred to employ a separate motor actuator 93, particularly one of the stepping type which is activated intermittently in response to one or both reversals in the motion of the nut. Herein, the actuator comprises a stepping motor 94, that is, a brushless dc. motor having a fixed number of "steps" or stable positions per revolution and driven by sequential excitation of its windings. This motor is coupled by suitable gearing in a box 95 to a pinion 96 meshing with gear teeth 97 around one end of the drum 63.

When a motor of this type is energized, the drum is indexed one or more accurately defined steps as determined by the selected setting of a dial 98 on a conventional control unit 99. In the present instance, energization of the step motor is effected at the ends of both up and down strokes of the unit by the provision of parallel circuits 101 and 102 for the motor controller adapted to be closed by switches 103 and 104 which are closed by the energization of the respective relays 86 and 87. Each of these switches remains closed while the relay armature remains latched but the step motor is advanced only one step in each instance. The step motor may also be actuated under manual control by operating a push button switch 105 in parallel with the switches 103 and 104.

Energization of the relays 86 and 87 may be controlled by other kinds of sensors operating electrically and without the necessity of contacting the pattern mechanically. Such a modified sensor is shown in FIG. 5 in which the pattern takes the form of a flexible band 107 wrapped around the drum surface and having the desired circumferentially changing contour. Such a band may be secured to the drum by pressure sensitive adhesive and composed of non-conductive material having permanent magnets in the form of powder particles or fine granules distributed uniformly through the material. A permanent magnetic field thus exists adjacent the band surface over the entire area thereof and this field may be sensed by a so-called reed switch 108 mounted, as in the case of the units 68, 69 on one of the adjustable blocks 70 and in close proximity to the drum surface. The switch is so positioned that its contacts 109 become closed as they come into the magnetic field when reaching the edge of the band.

Pairs of bands 107 and reed switches 108 may be mounted on the blocks 70 above described and arranged to operate through suitable amplifiers to control the energization of the relays 86 and 87 the same as with the photosensitive feeler first described.

OPERATION

A pattern sheet 66 is first wrapped around and secured to the drum 63 with the starting points on the pattern lines 61, 62 in line with feeler units 68, 69 with the latter disposed between the pattern lines. In this instance, when power is applied to the circuit, both relays 86, 87 will be deenergized. Reciprocation of the nut may then be initiated by closing a push button switch 105 to energize the relay 86 and close the switch 71 thereby energizing the winding 46 to engage the clutch 37, the switch closure being retained by the latch 72.

When the sensor 69 reaches the pattern line 61, the relay windings 87 and 74 are energized thus releasing the latch 91 to open the switch 71 and release the clutch 37. The relay 87 closes the switch 88 thus energizing the winding 51 to engage the clutch, closure of the switch 71 being maintained by the latch 91 and the clutch 37 remaining engaged as the sensor 69 moves away from the pattern line 61. Downward movement of the nut is thus interrupted and upward movement thereof is initiated.

Reversal of the drive is effected in the same way and downward movement of the nut is initiated when the sensor 68 reaches the pattern line 62. Thus, the relay winding 92 is energized to release the latch 91 and deenergize the clutch 38. At the same time, the relay 86 and the winding 46 are energized, thus engaging the clutch 37. Holding of the switch 71 closed by the latch 72 maintains the clutch engagement as the sensor 68 moves away from the line 62 and across the central part of the pattern sheet.

At the times of the alternate reversals of the drive, the switches 103 and 104 are closed and the step motor energized to index the drum one step and thus present a new part of the pattern lines 61, 62 in the ensuing line of travel of the sensors 68, 69. Thus, the lengths of the successive up and down strokes of the nut 18 and the ring rail 19 as well as the points of the reversals are varied automatically in accordance with the changing contours of the pattern lines. After a predetermined number of strokes required for complete building of the thread masses on the bobbins 12, the drive may be disabled by engagement of the actuator of a stationarily mounted switch 112 by a cam 113 projecting from the periphery of the drum 63.

It will be obvious that various other types of circuits and switching devices may be employed to effect the energization and deenergization of the clutch and brake windings as well as holding the proper energizations while the feeler is moving from one pattern line to the other. Also, the pattern drum may, if desired, be driven continuously instead of step by step during the building of the yarn masses on the bobbins.

We claim:

1. A reversible variable stroke power transmission having, in combination, a screw shaft, a nut threaded thereon for movement back and forth during turning of the shaft in opposite directions, a source of rotary power, means including first and second friction clutches adapted to be activated selectively to couple said power source to said shaft for driving the latter in opposite directions, a drum rotatable about an axis paralleling said shaft, means for indexing said drum unidirectionally about said axis, a flexible pattern wrapped around and detachably secured to said drum surface including lines laterally spaced apart along and extending around the surface and contrasting with the area between the lines, a feeler carried by and movable with said nut but out of mechanical contact with said pattern and drum in all positions of the nut, said feeler scanning the areas of the durm between said lines and producing first and second signals when reaching said lines after traversing the intervening area of the drum, and mechanism controlled by first and second signals to activate said clutches selectively and produce movements of the nut alternately in opposite directions whereby the length of each alternate movement of said nut is determined by the spacing of said pattern lines and the angular position of said drum.

2. A reversible power transmission as defined in claim 1 in which said indexing means comprises an electric step motor energized intermittently in response to one of said signals and adapted when energized to index the drum through a predetermined angle.

3. A reversible power transmission as defined in claim 1 in which said feeler includes two parts respectively producing said first and second signals, and means carried by said nut and supporting the two feelers in spaced relation along said drum.

4. A reversible power transmission as defined in claim 3 including means mounting said feeler parts on said nut for selective adjustment toward and away from each other along the axis of said drum whereby the positions of the reversals of the motions of the nut in response to said lines may be adjusted individually along the drum.

5. A reversible power transmission as defined in claim 1 in which said clutches are activated alternately in response to the respective ones of said signals and the transmission includes means operated as an incident to engagement of one of said clutches by one of said pattern lines to maintain such engagement as the feeler moves reversely away from such line and until it reaches the other of the pattern lines.

6. A reversible power transmission as defined in claim 1 in which said lines and the adjacent area of said pattern are of contrasting colors and said feeler operates photoelectrically to produce said first and second signals in passing from the intervening pattern area onto the respective lines.

References Cited

UNITED STATES PATENTS

| 2,679,620 | 5/1954 | Berry. | |
| 2,837,046 | 6/1958 | Carson et al. | 112—118 |
| 3,006,209 | 10/1961 | Stromberg | 192—84 XR |
| 3,067,961 | 12/1962 | Chidgey et al. | 242—26.3 |
| 3,370,799 | 2/1968 | Rogers | 242—26.3 |

JORDAN FRANKLIN, Primary Examiner

WERNER H. SCHROEDER, Assistant Examiner

U.S. Cl. X.R.

74—59; 192—51, 84; 242—26.3; 318—282